(12) United States Patent
Miller et al.

(10) Patent No.: US 9,805,094 B2
(45) Date of Patent: Oct. 31, 2017

(54) USER INTERFACE DISPLAYING FILTERED INFORMATION

(75) Inventors: Mark Anthony Miller, South Orange, NJ (US); Theodore O. Calvin, Austin, TX (US); Matthew John O'Donnell, Furlong, PA (US)

(73) Assignee: IPC SYSTEMS, INC., Jersey City, NJ (US)

( * ) Notice: Subject to any disclaimer, the term of this patent is extended or adjusted under 35 U.S.C. 154(b) by 603 days.

(21) Appl. No.: 13/289,798

(22) Filed: Nov. 4, 2011

(65) Prior Publication Data

US 2013/0113696 A1    May 9, 2013

(51) Int. Cl.
*G06F 17/30* (2006.01)

(52) U.S. Cl.
CPC .............................. *G06F 17/30516* (2013.01)

(58) Field of Classification Search
CPC ................................................ G06F 17/30516
USPC .......................................................... 345/156
See application file for complete search history.

(56) References Cited

U.S. PATENT DOCUMENTS

| | | | |
|---|---|---|---|
| 7,003,777 B2 * | 2/2006 | Hines | 719/316 |
| 2001/0044834 A1 * | 11/2001 | Bradshaw et al. | 709/217 |
| 2002/0062463 A1 * | 5/2002 | Hines | 714/38 |
| 2002/0087953 A1 * | 7/2002 | Hines | 717/125 |
| 2003/0121027 A1 * | 6/2003 | Hines | 717/135 |
| 2005/0235264 A1 * | 10/2005 | Hines | 717/124 |
| 2005/0246682 A1 * | 11/2005 | Hines | 717/109 |
| 2007/0002846 A1 * | 1/2007 | Rada et al. | 370/358 |
| 2007/0039049 A1 | 2/2007 | Kupferman et al. | 726/22 |
| 2008/0301175 A1 | 12/2008 | Applebaum et al. | 707/102 |
| 2010/0057600 A1 | 3/2010 | Johansen et al. | 705/37 |

FOREIGN PATENT DOCUMENTS

WO    WO 2004/107200 A1    12/2004

OTHER PUBLICATIONS

International Search Report and Written Opinion of the International Searching Authority for International Patent Application No. PCT/US2012/061276 (Jan. 17, 2013).

* cited by examiner

*Primary Examiner* — Fred Tzeng
(74) *Attorney, Agent, or Firm* — Merchant & Gould P.C.

(57) ABSTRACT

A trigger event is set, based on information in an information flow. One or more actions are set to occur in response to occurrence of the trigger event. The information flow is received. The set one or more actions are performed upon occurrence of the trigger event, and a user interface is displayed based on the information flow. The actions include, but are not limited to, filtering display of information from the information flow in response to occurrence of the trigger event.

21 Claims, 7 Drawing Sheets

FIG. 5

USER INTERFACE DISPLAYING FILTERED INFORMATION

BACKGROUND

Field

Example aspects of the present invention generally relate to display of a user interface, and more particularly to a user interface for displaying multimedia data that is of relevance to the end user.

Related Art

In the financial industry and other information-intensive environments, it is common for a user to receive information from multiple sources. For example, a stock trader may receive emails with financial news, while also monitoring the stock market average online. To that end, a user might switch between multiple applications or web pages on a computer to view different data.

However, the received data can often include large amounts of information which is not important enough for the user's attention, delivered too late to be of significant value, or which is simply irrelevant. Thus, the user is required to sift through large amounts of data in the hopes of finding relevant information. Moreover, the user is generally unaware of the occurrence of significant events or the release of important information. As such, the user must consume significant time and effort monitoring for important information, and may in some cases miss such information entirely.

BRIEF DESCRIPTION

The example embodiments described herein address the foregoing by providing systems, apparatuses, methods, and computer program products for display of a user interface. A trigger event is set, based on information in an information flow. One or more actions are set to occur in response to occurrence of the trigger event. The information flow is received. The set one or more actions are performed upon occurrence of the trigger event, and a user interface is displayed based on the information flow. The actions include, but are not limited to, filtering display of information from the information flow in response to occurrence of the trigger event.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings.

FIG. 5 is a representative view of still another example user interface according to the invention.

DETAILED DESCRIPTION

I. Overview

Figure 1:
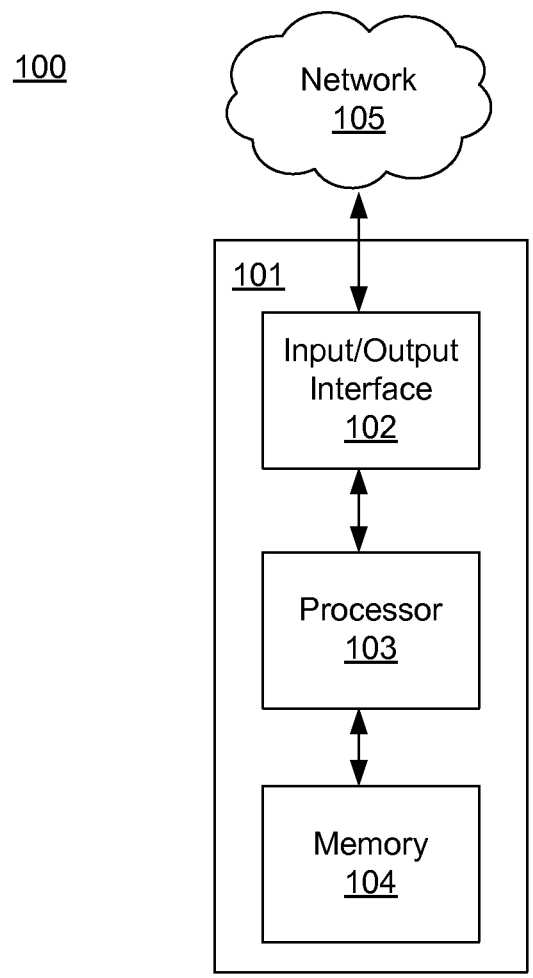
FIG. 1 is a representative view of a system in which some embodiments of the invention may be implemented.

The example embodiments of the invention presented herein are directed to apparatuses, methods, and computer program products for displaying a user interface in a trading environment using consumer or professional devices. This description is not intended to limit the application of the example embodiments presented herein. In fact, after reading the following description, it will be apparent to one skilled in the relevant art(s) how to implement the following example embodiments in alternative environments, such as a services-based environment, a web services-based environment, etc.

II. Definitions

Some terms are defined below for easy reference. However, it should be understood that the defined terms are not rigidly restricted to their definitions. A term may be further defined by its use in other sections of this description.

"Consumer" and the like means a consumer, user, client, and/or client device in a marketplace of products and/or services.

"Content" and the like is generally understood to include multimedia content such as data feeds, videos, television shows, movies, and broadcasts of various types. Content may be stored on, for example, a Blu-Ray Disc, Compact Disc, Digital Video Disc, floppy disk, mini disk, optical disc, micro-drive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of storage device.

"Device" means software, hardware or a combination thereof. A device may sometimes be referred to as an apparatus. Examples of a device include without limitation a laptop computer, a database, a server, a display, a computer mouse, and a hard disk.

"Network" means a connection between any two or more computers, which permits the transmission of data. A network may be any combination of networks, including without limitation the Internet, a network of networks, a local area network (e.g., home network, intranet), a wide area network, a wireless network and a cellular network.

"Server" means a software application that provides services to other computer programs (and their users), in the same or another computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" and "application" mean a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++, and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"System" means a device or multiple coupled devices. A device is defined above.

"User device" (e.g., "client", "client device", "user computer") is a hardware system, a software operating system and/or one or more software application programs. A user device may refer to a single computer or to a network of interacting computers. A user device may be the client part of a client-server architecture. A user device may rely on a server to perform some operations. Examples of a user device include without limitation a personal media device, a portable media player, an iPod™, an iPad™, a laptop computer, a palmtop computer, a smart phone, a cell phone, a mobile phone, a network attached storage (NAS) device, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

III. System

FIG. 1 is a representative view of a system in which some embodiments of the invention may be implemented. As shown in FIG. 1, system 100 includes user device 101 coupled to communication network 105. More specifically, user device 101 includes input/output interface 102, which is communicatively coupled to, and provides bi-directional communication capability between the user device 101 and multiple other devices, such as information sources, via communication network 105. Information data of an information flow is transmitted via network 105, is received by input/output interface 102 and is forwarded to processor 103 for processing. In that regard, information may be transmitted in real-time or pseudo-real-time over network 105 to user device 101. Moreover, information transmitted over network 105 may include various different types of multimedia data including, for example, live or recorded video or audio, social networking updates, and market statistics, among many others.

While the disclosure refers to a singular "information flow" received at user device 101, it should be understood that the information flow may likely include multiple information flows or transmissions from multiple information sources connected to network 105. For example, the information flow ultimately received at user device 101 may reflect, among others, a news feed from a news source, market tracking statistics from another source, and social media updates from a variety of other sources.

Processor 103 is also communicatively coupled to memory 104, which contains program instructions that processor 103 executes to perform, among other tasks, functions associated with displaying a user interface. Example functions stored in memory 104 and executed by processor 103 include receiving an information flow and displaying a user interface, setting a trigger event and actions to occur in response to the trigger event, and filtering display in response to the trigger, etc.

Memory 104 may also store input data from the information flow, such as streaming video data or market statistics. In some embodiments, memory 104 might further store, for example, information regarding trigger events for changing or modifying the information flow, contact information for individuals or groups to contact in response to information in the information flow, network history, etc. Various other data may be stored in memory 104.

Processor 103 receives the information flow, e.g., over network 105. Processor 103 displays a user interface based on the information flow, and sets a trigger event based on information in the information flow. One or more actions are set to occur in response to occurrence of the trigger event. The actions include filtering display of information from the information flow in response to occurrence of the trigger event, as described more fully below.

IV. Device

Figure 2:
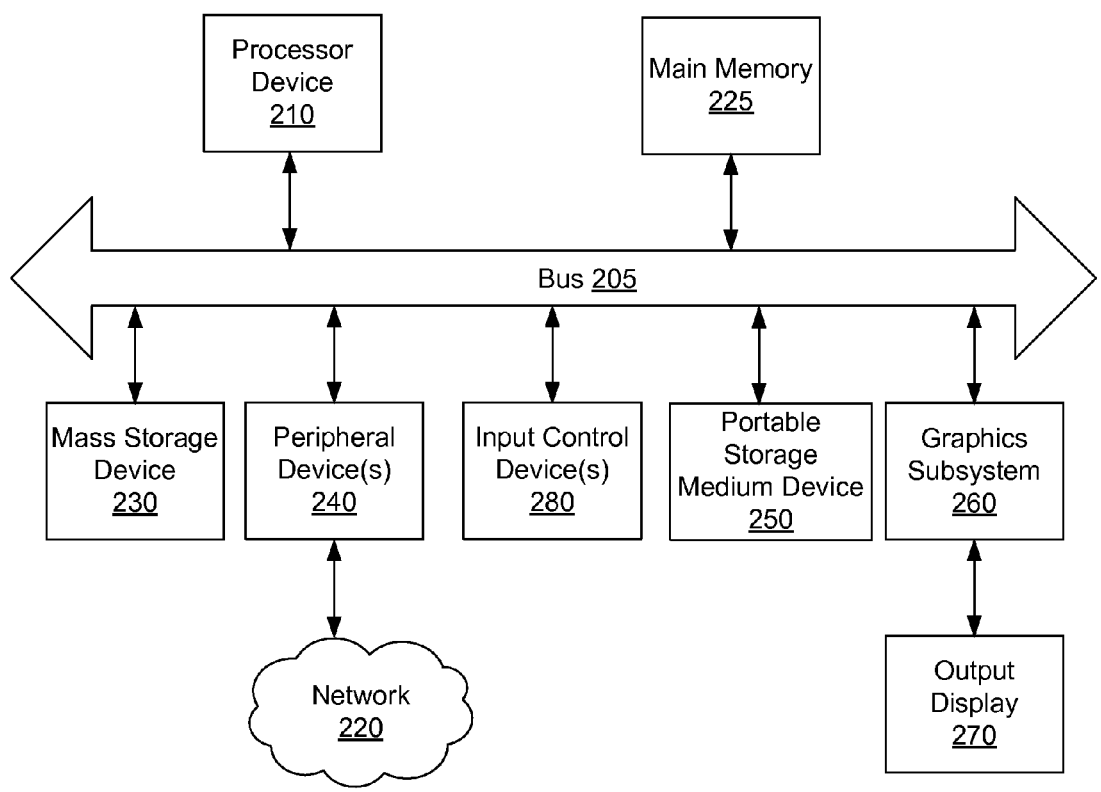
FIG. 2 is a block diagram of a user device for use with various example embodiments of the invention.

FIG. 2 is a block diagram of a general and/or special purpose computer 200, which may be a general and/or special purpose computing device, in accordance with some of the example embodiments of the invention. The computer 200 may be, for example, a user device, a user computer, a client computer and/or a server computer, among other things.

The computer 200 may include without limitation a processor device 210, a main memory 225, and an interconnect bus 205. The processor device 210 may include without limitation a single microprocessor, or may include a plurality of microprocessors for configuring the computer 200 as a multi-processor system. The main memory 225 stores, among other things, instructions and/or data for execution by the processor device 210. The main memory 225 may include banks of dynamic random access memory (DRAM), as well as cache memory.

The computer 200 may further include a mass storage device 230, peripheral device(s) 240, portable storage medium device(s) 250, input control device(s) 280, a graphics subsystem 260, and/or an output display interface 270. For explanatory purposes, all components in the computer 200 are shown in FIG. 2 as being coupled via the bus 205. However, the computer 200 is not so limited. Devices of the computer 200 may be coupled via one or more data transport means. For example, the processor device 210 and/or the main memory 225 may be coupled via a local microprocessor bus. The mass storage device 230, peripheral device(s) 240, portable storage medium device(s) 250, and/or graphics subsystem 260 may be coupled via one or more input/output (I/O) buses. The mass storage device 230 may be a nonvolatile storage device for storing data and/or instructions for use by the processor device 210. The mass storage device 230 may be implemented, for example, with a magnetic disk drive or an optical disk drive. In a software embodiment, the mass storage device 230 is configured for loading contents of the mass storage device 230 into the main memory 225.

The portable storage medium device 250 operates in conjunction with a nonvolatile portable storage medium, such as, for example, a compact disc read only memory (CD-ROM), to input and output data and code to and from the computer 200. In some embodiments, the software for storing information may be stored on a portable storage medium, and may be inputted into the computer 200 via the portable storage medium device 250. The peripheral device(s) 240 may include any type of computer support device, such as, for example, an input/output (I/O) interface configured to add additional functionality to the computer 200. For example, the peripheral device(s) 240 may include a network interface card for interfacing the computer 200 with a network 220.

The input control device(s) 280 provide a portion of the user interface for a user of the computer 200. The input control device(s) 280 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 200 may include the graphics subsystem 260 and the output display 270. The output display 270 may include a cathode ray tube (CRT) display and/or a liquid crystal display (LCD). The graphics subsystem 260 receives textual and graphical information, and processes the information for output to the output display 270.

Each component of the computer 200 may represent a broad category of a computer component of a general and/or special purpose computer. Components of the computer 200 are not limited to the specific implementations provided here.

V. User Interface

Figure 3A:
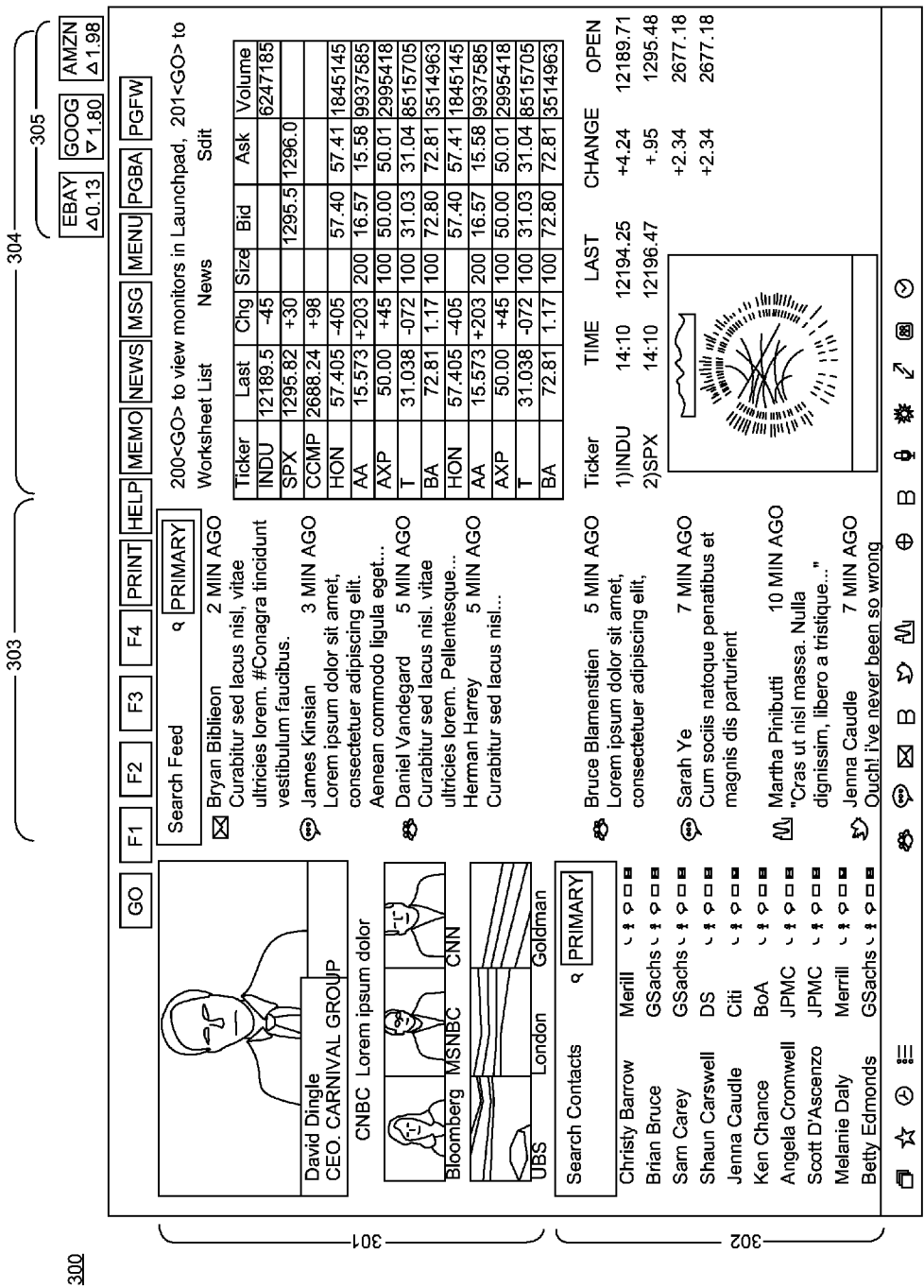
FIG. 3A is a representative view of an example user interface according to the invention.
Figure 3B:
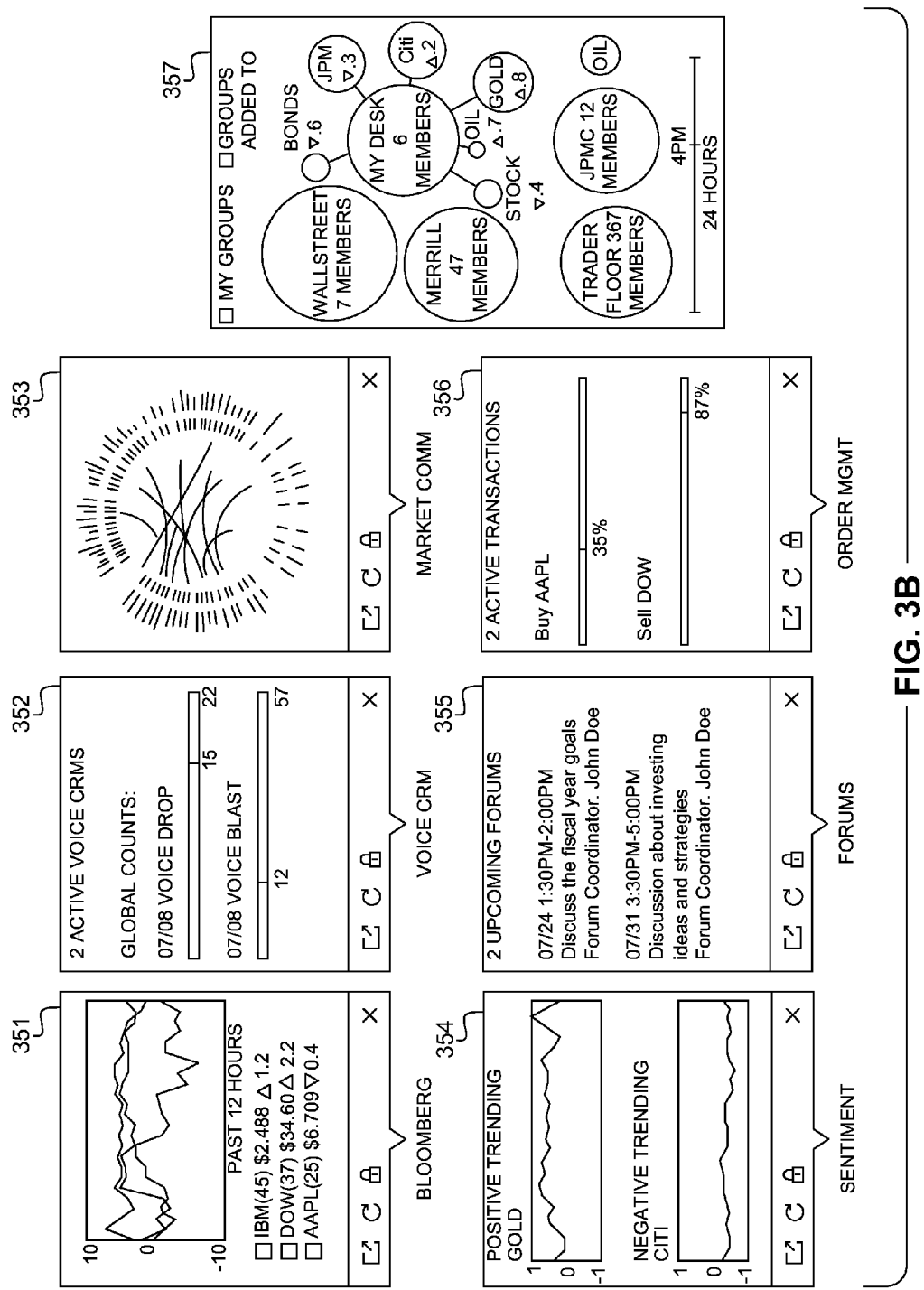
FIG. 3B is a representative view of example application displays according to the invention.

FIG. 3A and FIG. 3B are representative views of an example user interface according to the disclosure. In that regard, FIG. 3A and FIG. 3B depict simplified examples of the user interface and information displayed therein, and it should be understood that the information displayed in the user interface and the arrangement thereof may vary.

In addition, while the disclosure describes the user interface in the context of filtering and displaying filtered financial information, it should be understood that the present disclosure can be applied to various other types of information.

As shown in FIG. 3A, user interface 300 includes video section 301, contact section 302, information feed section 303, application workspace 304, and trigger notification 305.

Video section 301 is a section of user interface 300 for displaying live or pre-recorded video and/or audio data, such as video conferences, video calling, video broadcasting (e.g., television and morning calls), and a video presence (e.g., video surveillance of remote trading environment). To that end, video section 301 may use, for example, session initiation protocol (SIP) technology, Real-time Transport Protocol (RTP), or an audio/video coder/decoder (codec). SIP technology generally controls multiple communication sessions such as voice and video calls over Internet Protocol (IP) by creating, modifying and terminating two-party (unicast) or multiparty (multicast) sessions consisting of one or several media streams. The Real-time Transport Protocol (RTP) defines a standardized packet format for delivering audio and video over IP networks. RTP is used extensively to handle streaming media, such as telephony, video teleconference applications and web-based push-to-talk features. A codec is a device or computer program capable of encoding and/or decoding a digital data stream or signal. A codec encodes a data stream or signal for transmission, storage or encryption, or decodes it for playback or editing. Codecs are used in video conferencing, streaming media and video editing applications.

As also shown in FIG. 3A, video section 301 may include multiple selectable video sources, in addition to a main video window for displaying a primary or selected source. Thus, for example, a user may be provided smaller images or video streams representing six selectable video windows (the individual smaller videos may or may not be actively playing), and the user may select one of the six options for display on the larger main video window. Additionally, the video section 301 may provide icons or selectable objects by which the user can, for example, "pop-out" the video from its docked position in user interface 300, adjust volume, and the like. Moreover, text or other labels may be provided for different video windows, to aid the user in differentiating between the different video windows.

The view in video section 301 may change in response to user selections, or in response to a trigger event, e.g., a change in a price of a financial instrument, or based on other information shown in the user interface. For example, video section 301 might change to display an enlarged video communication from a particular contact in response to a trigger event, and other video options may be minimized or eliminated entirely. Video section 301 might also include progress indicators indicating, for example, the progress of making a call to a particular video respondent. Moreover, video section 301 may provide an icon or object to add additional participants to a video display or broadcast, whereby video of the added participant is added to video section 301.

In one practical example, video section 301 may display multiple video feeds including trading floors, a television broadcast, and the like. A video communication channel may be opened to communicate to one or more persons, and then additional individuals may be added to the video chat. Documents may also be shared amongst participants. For example, a document shared from another individual may temporarily replace the video feed of that individual in video section 301. Thus, while in video conference, the user may be provided with the ability to share applications or documents on user interface 300 with other users across the network so as to facilitate video and web collaboration.

Contact section 302 is a section of the user interface which provides display of integrated contact information, as well as selectable and filterable actions for each contact. The contact section 302 integrates local, centralized, and customer directories into a common filterable and actionable framework.

As seen in FIG. 3, selectable objects are provided for each individual contact listed in contact section 302 and may, for example, represent different ways of reaching that contact. Thus, for example, icons displayed next to each contact may allow the user to reach that contact via a dial-tone line/private line, an intercom, an instant message, a video, or an email. These are represented, respectively, by the selectable icons of a phone, a microphone, a word bubble, a video camera icon, and an envelope. Other contact options or icons are possible.

Contact section 302 may also provide icons or other selectable objects to modify the display of contact section 302. For example, icons may be provided by which a user can select a list of favorite contacts, a contact history (e.g., which contacts have been reached over a certain period of time), or a call list. A search window may further be provided whereby a user can enter names or other information by which to search the contact list. Contact section 302 may also provide icons to select display of smaller contact lists or sub-groups of contacts.

Contact section 302 may further provide a modified view showing detailed information for a selected contact (not shown). Thus, for example, if a user selects (e.g., clicks on) a particular contact in the list of contacts contact section 302, contact section 302 may change to display detailed information solely about that contact. The detailed information could include an image of the contact, recent actions by the contact and/or transaction history of the contact (e.g., in a financial environment, holdings and trades), and communications history with the contact, among many others. Moreover, the detailed information display may provide selectable objects depicting actions regarding the selected contact, such as, for example, contacting the contact, open action items regarding the contact, or transactions to propose or make with the contact. Relevant work associated with a particular contact, filtering of the contact list, or other events may be initiated based on a trigger event detected in the information flow, as discussed more fully below.

Information feed 303 is a section for displaying information and updates from various sources, including, for example, news sources (e.g., Reuters™ and Bloomberg™), from instant messaging or other messaging (e.g., Microsoft™ Lync Server/Microsoft™ Office Communications Server), persistent chat with other devices, individuals or groups, output from real-time voice analytics (e.g., transcription of a current telephonic session), and updates or information from social media sources (e.g., Twitter™, Facebook™, etc), among others. The information may be received in real-time or pseudo-real-time.

As shown in FIG. 3A, information feed 303 displays an ongoing list of information, communications and updates from multiple sources, along with an icon indicating the type of source. The information may include, for example, emails, instant messages, persistent local or external chats, voice transcriptions of audio such as a telephone conversation or pre-recording, and social networking posts via Twitter™ or Facebook™, among many others. Information feed 303 may also depict information regarding the timing of the information, such as when the information was posted by the source, as well as text or other display indicating the source's affiliation. Information feed 303 may also allow responses to such communications in the display of information feed 303, such as by displaying a "reply" field associated with each communication, and may also display replies from other users.

As described more fully below, information feed 303 may be filtered in response to a trigger event, such as a stock price reaching a certain value.

Information feed 303 may also provide icons or other selectable objects to modify the display of information feed 303. For example, a search window may further be provided whereby a user can enter names or other information by which to search the information feed. Additionally, an object may be provided whereby a user can select a pre-set group of sources or individuals from which to receive information.

Moreover, information feed 303 may provide selectable icons or objects to allow the user to select which types of information to receive. For example, a user may select an icon to receive information only from, e.g., persistent chat, instant messaging, email, Bloomberg™, Twitter™ or voice transcription.

In one practical example, multiple communication sources can be routed into a threaded window view in information feed 303. A user may focus on events and communications in persistent chat by temporarily disabling other communication sources. The user may further switch to an edit mode in order to subscribe to a new chat room and configure rules for that source, after which the new subscription can add communication events to information feed 303.

Application workspace 304 is a display area for various applications which may be used by the user. The application area allows the user to swap applications in the workspace, including to or from other parts of the screen where action is required. Applications can be switched to or made active in response to trigger events, as described more fully below. Applications may include, for example, internal applications such as market communications visualization applications, voice drop/voice blast/voice forums applications, and financial analysis applications, and line of business applications such as market data applications from Bloomberg™ or Reuters™, and order management systems/execution management systems (OMS/EMS). Numerous other applications are possible. In addition, it may be possible to share a view of applications currently executing in application workspace 304 with other users or groups on the network.

Additional icons can be provided for each application by which to "pop-out" the application from application workspace 304 to reload application information, to add security to the application, or to move the application to other positions in the user interface, among others.

Examples of applications which may be displayed in application workspace 304 will be described below with respect to FIG. 3B.

In particular, FIG. 3B depicts Bloomberg™ application 351, voice customer relations management (CRM) application 352, market communication application 353, sentiment analysis application 354, forum application 355, order management application 356, and social networking application 357.

Bloomberg™ application 351, for example, is an application which tracks market activity and displays a corresponding graph on application workspace 304, along with statistics about individual stocks (e.g., a stock ticker). Voice customer relations management (CRM) application 352 allows for counting of voice drops and voice blasts of audio messages to clients or other groups or individuals. Market communication application 353 may display a detailed diagram of communications and orders between various individuals and groups such as customers, coworkers, and affiliated companies. Sentiment analysis application 354 depicts graphs for positive and negative sentiment trending of investments based on voice and other data sources, and forum application 355 provides information about upcoming forum events, such as the schedule, title, and coordinator. Order management application 356 depicts transaction information, such as the progress of active transactions. Social networking application 357 allows for organizing of contacts into relevant groups, finding new individuals that could be added to a group, and sharing of multimedia information to and from the defined groups. Custom groups can be actively managed, and/or dynamic smart groups can be automatically managed. In addition, groups can be shared. The above applications are only examples, and various other applications (e.g., Microsoft™ Excel, Microsoft™ Word) are possible.

Returning to FIG. 3A, trigger notification 305 allows for a user to see notifications of triggered events and select trigger events and actions corresponding to the trigger events. Thus, for example, if multiple trigger events have occurred, the trigger events can be placed in a queue, and trigger notification 305 allows the user to select a trigger event so as to perform actions in response to the selected trigger event. A selected (active) trigger event may be displayed differently than the other trigger events. In addition, the trigger toolbar may provide information about each trigger via an automatic display mechanism (e.g., a "rollover" display), by which the information is displayed without manually selecting the associated object. The toolbar may also allow a user to add additional displays and alerts, edit the rollover information, and modify the trigger conditions and alerts.

As mentioned above, each of the above-described sections of user interface 300 may change in response to trigger events. For example, video section 301, contact section 302, information feed 303 or application workspace 304 may be changed in response to the trigger event. In a financial services environment, for example, a financial instrument (e.g., a stock) reaching a certain threshold value may trigger filtering of contacts to those who hold the stock, and filtering of video and the information feed to only those associated with that stock. These processes will be described more fully below with respect to FIG. 4A to FIG. 5.

VI. Processes

Figure 4A:
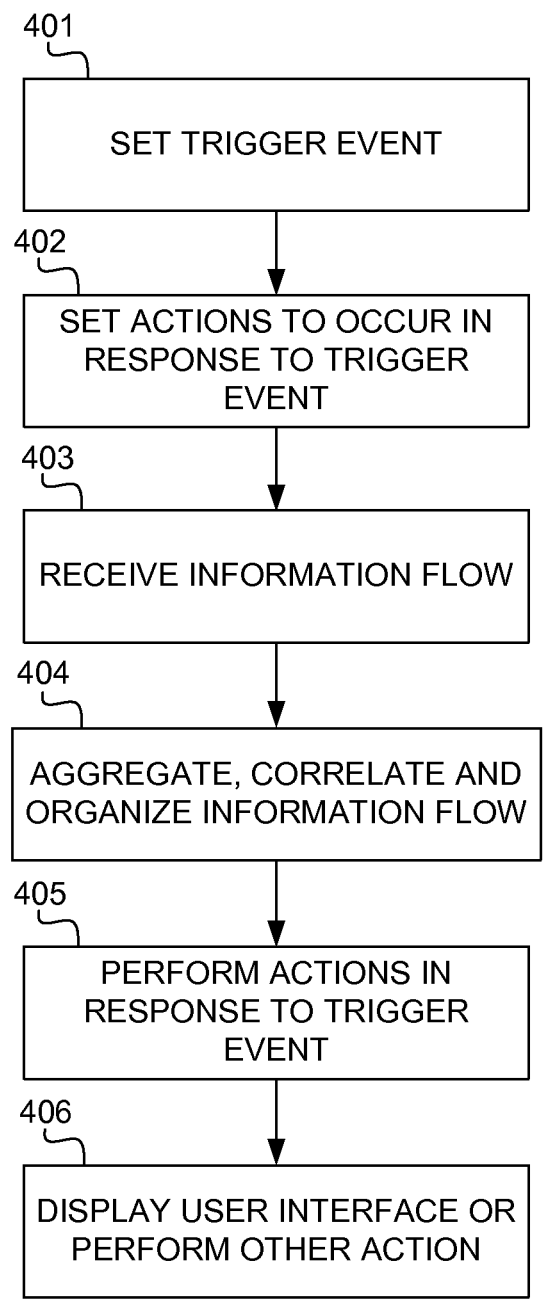
FIG. 4A is a flowchart diagram showing an exemplary procedure for generating and modifying a user interface.

FIG. 4A is a flowchart depicting an exemplary process for displaying a user interface. In that regard, it should be understood that some steps in the process may be performed continuously, or only as needed, and therefore that the particular order and sequence of steps might change.

Briefly, in FIG. 4A, a trigger event is set, based on information in an information flow. One or more actions are set to occur in response to occurrence of the trigger event. The information flow is received. The set one or more actions are performed upon occurrence of the trigger event, and a user interface is displayed based on the information flow. The actions include filtering display of information from the information flow in response to occurrence of the trigger event.

In more detail, in step 401, a trigger event is set based on information in an information flow, and in step 402, one or more actions are set to occur in response to occurrence of the trigger event. The actions may include, for example, filtering display of information from the information flow in response to occurrence of the trigger event, contacting a person or group via telephone or video conferencing, or switching a part of the user interface to display to a predetermined application in response to the trigger event. The triggers could also be shared across a team or organization to allow analysis and improvement of strategies.

Figure 4B:
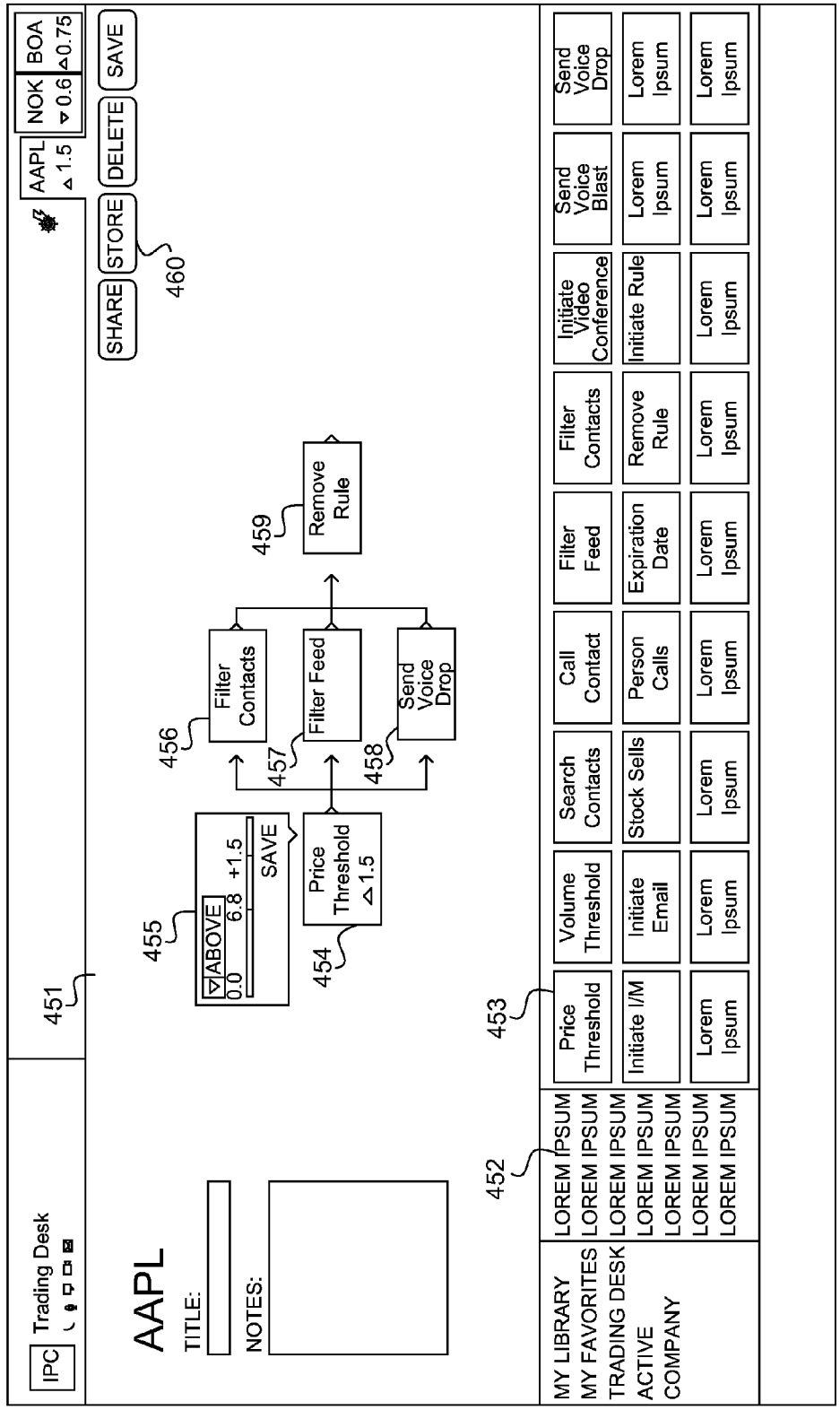
FIG. 4B is a representative view of another example user interface according to the invention.

In that regard, FIG. 4B depicts an example of a user interface by which a user may set trigger events and corresponding actions. The combination of a trigger event and an action or actions corresponding thereto may be referred to as a "rule".

Specifically, FIG. 4B displays a user interface 450 for setting triggers and corresponding actions. Background 451 serves as a virtual desktop on which other elements can be arranged. Window 452 lists text indicating a series of rules previously created by the user, as well as the rule currently being constructed (i.e., trigger 454 and actions 456, 457 and 458) on background 451. Library 453 is a set of objects representing triggers and actions, each of which can be dragged onto background 451 for use in constructing a rule. Element interface 455 is a user interface for customizing the trigger, for example, by selecting a threshold value and whether the trigger is activated above, below, or at that value.

In the example shown in FIG. 4B, the user has selected a trigger 454 for when "price threshold" of a particular financial instrument increases above 1.5. The user has also selected actions to occur in response to the trigger, including filtering of contacts 456 (e.g., to correspond to those affiliated with the investment at issue), filtering of feed 457 (e.g., to filter information feed 303 to only information which pertains to the investment), and send voice drop 458 (e.g., sending a recorded voice message to one or more contacts). The user has also selected remove rule 459 to remove the actions, but has not indicated trigger events to trigger removal of the rule. Additional user interface elements 460 allow the user to share the rule with other users on the network, or to store, delete, or save the rule.

Thus, in this example, an additional user interface is displayed for receiving selections of trigger events and corresponding actions from a predefined library, selections of at least one trigger event and at least one corresponding action are received via the additional user interface, and the trigger event and action are set based on the selections.

While FIG. 4B depicts one example of a user interface, it should be understood that the user interface 450 could take other forms. For example, the user interface 450 could be implemented as a smaller drop-down menu from trigger notification 305, as described more fully below with respect to FIG. 5.

When multiple trigger events occur, the multiple trigger events can be placed in a queue, and the user interface can provide inputs by which a user can select a trigger event in the queue to thereby perform the corresponding action. In FIG. 3A, for example, trigger notification 305 may include tabs for each trigger event that has occurred. Moreover, an alert or other notification can be provided on the user interface when the trigger event has occurred, such as by illuminating or blinking the newly-indicated tab corresponding to the trigger.

Returning to FIG. 4A, in step 403, the information flow is received. The information flow may include information and content being transferred in real-time or pseudo real-time. For example, the information flow may include video conferences, video calling, video broadcasting (e.g., television and morning calls), a video presence, communications from contacts or additional contact information, emails, instant messages, persistent local or external chats, voice transcriptions of audio such as a telephone conversation or pre-recording, social networking posts via Twitter™ or Facebook™, and data associated with various applications such as stock trackers or other statistical analysis, among many others. Thus, the information flow may include data from multiple sources, in various different multimedia types. The different multimedia types may be displayed in different portions of the user interface, as described above.

In step 404, the information flow may be aggregated, correlated, and organized in order to tailor the information flow to information relevant to the user. To that end, the aggregation and correlation engine may use various technologies to transform aspects of multimedia content into a common text based format that can be used for further processing. For example, the subject/title, author/sender, send date, and/or body of Email, Instant Messages, Persistent Chat, Market Data, and Twitter™ Feeds can be placed in a data structure that allows for consistent searching and retrieval. Non text-based multimedia such as telephone calls or video, can go through a pre-process where the audio is first transcribed into a text, even if just for the above processing, so that it can be aggregated and correlated with the text-based data sources. This can be done in memory to allow for real-time or near real-time processing.

In other examples, an aggregation or integration service such as Autonomy™ IDOL may be used to search, gather and organize information for the information flow from databases, audio, video or text files or streams, and to transmit the data to a user device for use in user interface 300.

Nevertheless, the information flow may include a large amount of information which is irrelevant or less relevant to the user, and which might obscure information more important to the user. Accordingly, even in the absence of a trigger event, the information flow may be filtered to information which is more relevant. More specifically, there may be a determination of information of relevance in the information flow, and the information flow may be filtered or tailored such that only information of relevance is displayed in the user interface. The determination of relevance could be based on, for example, predefined user selections, whether the information is timely (e.g., received within a certain recent period of time), or whether the information is contextual to other information currently being displayed. Moreover, data from the various data sources may be correlated or organized in accordance with the determination of relevance, such that only relevant information from each data source is displayed.

Thus, filtering the information flow permits the user interface to display only information of relevance to the user, and to reduce the possibility that the user is confused, distracted or overwhelmed by irrelevant or untimely data.

In step 405, the set one or more actions are performed upon occurrence of the trigger event. The actions may include, for example, filtering the display in user interface 300 to reduce the information from the information feed so as to display only information associated with the trigger event. Thus, in response to a particular stock price increasing past a certain threshold, the information feed might be filtered to only information pertaining to that stock, and the contact list could be filtered to only those contacts associated with buying and selling that stock. Meanwhile, a market communication application could be launched in order to monitor or perform trades associated with the stock.

In another example, a situation might arise where a market data source updates, and the system notes a trigger event. Accordingly, an activity indicator on a market communication icon may provide a notification to a user, to cause the user to open a larger view (sometimes referred to as a flyout view) of market communication application 353, for example in application workspace 304. The user may then select triggers to pre-filter a contact list in contact section 302, based on, for example, information from stock tickers. The user may then switch to a contact view in contact section 302 upon occurrence of the selected trigger, and initiate contact with one or more individuals. The user might then capture and transcribe the call for sharing this data with other users on the network (e.g., via their communication feed).

In step 406, the user interface is displayed based on the information flow, and based on the one or more triggers and the corresponding actions. Thus, for example, the user interface 300 as shown in FIG. 3A may be displayed on a monitor or other display device, with filtering applied corresponding to one or more trigger events. The user interface may be continuously updated and filtered as information is received via the information flow. In another example, another action may be performed in response to the trigger event which is not necessarily related to the display of the user interface. For example, other actions such as placing a call to a contact or associate could be performed automatically in response to the trigger event, and in addition to (or independently from) display of the user interface.

Figure 5:
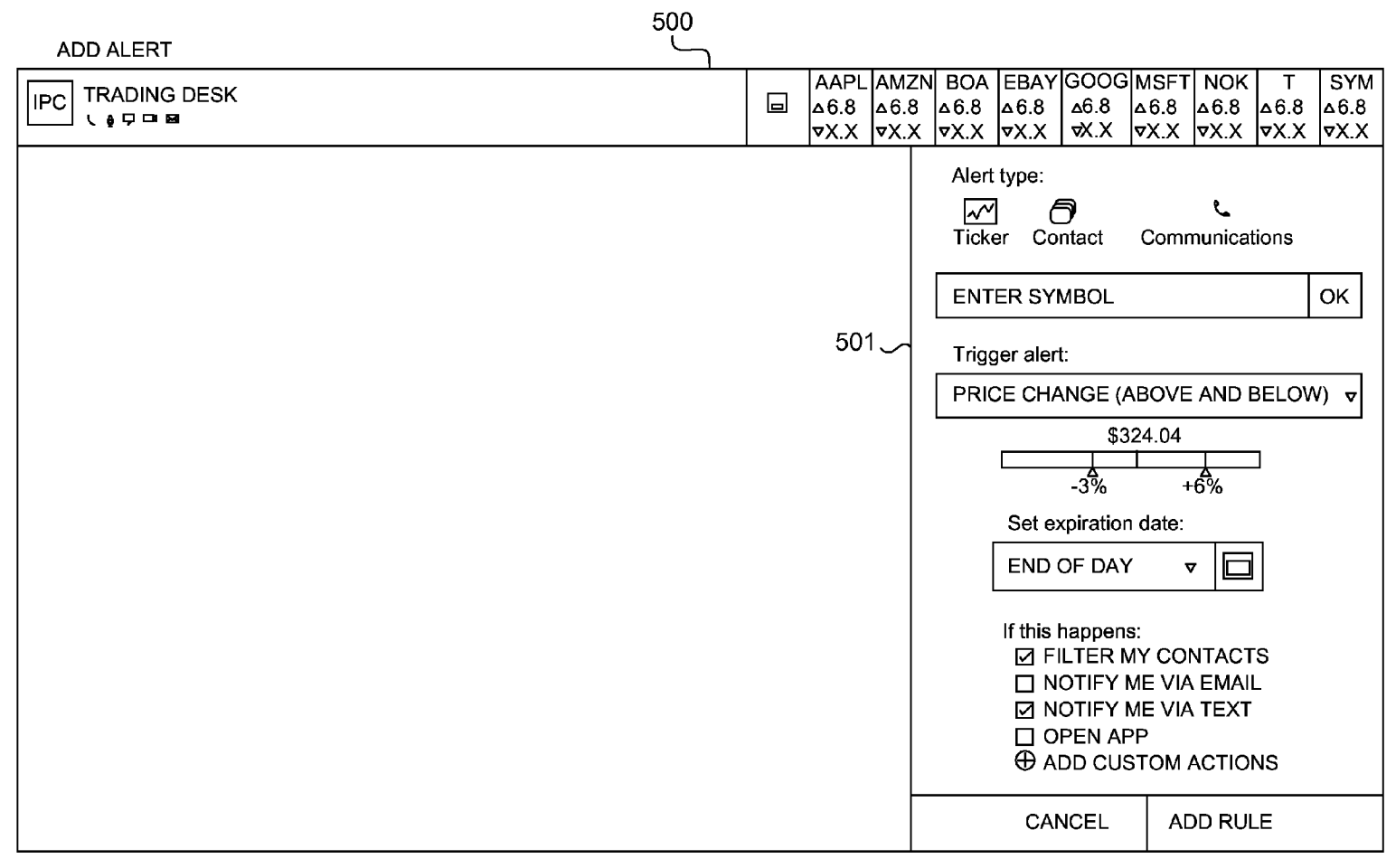

FIG. 5 depicts an example of another user interface for setting trigger events and corresponding actions.

In particular, FIG. 5 depicts a user interface 500 which drops down from trigger notification 305 in user interface 300. In this case, the user has selected one of the triggers from the trigger notification 305, and a drop-down menu 501 is provided to allow the user to modify the corresponding rule (i.e., the corresponding trigger event and actions). Thus, for example, the user can select a ticker icon and enter a stock symbol, and then select a corresponding trigger alert event, e.g., a price change above or below a certain threshold set by the user. The user can additionally set an expiration date for the rule, and select actions to be performed upon occurrence of the trigger event, such as filtering contacts in contact section 302, notifying the user via email or text, opening an application, or other actions customized by the user.

VII. Computer Readable Medium Implementation

The example embodiments described above such as, for example, the systems and procedures depicted in or discussed in connection with FIGS. 1 to 5, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method for displaying a user interface, comprising the steps of:
using at least one processor to perform:
setting a trigger event based on information in an information flow, the trigger event being associated with a financial instrument;
setting one or more actions to occur based on occurrence of the trigger event;
receiving the information flow;
displaying the user interface based on the information flow, the user interface being segmented into a plurality of sections including (1) a contact section in which contact information of a plurality of contacts is displayed and (2) a trigger notification section separate from the other ones of the plurality of sections, in which one or more trigger notification display icons respectively corresponding to each trigger event and indicating the respective trigger event that has occurred are displayed upon occurrence of the trigger event, wherein in a case that a trigger notification display icon of the one or more trigger notification display icons is selected, a second user interface drops down from the selected trigger notification display icon, including icons for modifying the trigger event for the corresponding trigger notification display icon or actions to be performed for the corresponding trigger event; and
performing the set one or more actions upon selection of the trigger notification,
wherein the performing the set one or more actions includes (1) filtering display of information from the information flow based on occurrence of the trigger event and (2) filtering display of the contact information so as to display contact information of ones of the plurality of contacts that are associated with the financial instrument.

2. The method according to claim 1, wherein the trigger event is the financial instrument reaching a threshold value.

3. The method according to claim 1, wherein the set actions include switching a part of the user interface to display a predetermined application in response to the trigger event.

4. The method according to claim 1, wherein the information flow includes information of different multimedia types, and wherein the different multimedia types are displayed in different portions of the user interface.

5. The method according to claim 1, wherein when multiple trigger events occur, the multiple trigger events are placed in a queue, and a plurality of trigger notifications are displayed within the trigger notification section, each of the trigger notifications being selectable to cause a corresponding action to be performed.

6. The method according to claim 1, wherein the trigger notification is further selectable to cause display of a menu enabling modification of the one or more actions to occur based on occurrence of the trigger event.

7. The method according to claim 1, wherein the plurality of sections further includes one or more of a video section, an information feed section, and an application workspace, and wherein the filtering includes reducing the information from the information feed displayed in one or more of the plurality of sections of the user interface so as to display only information associated with the trigger event.

8. The method according to claim 1, wherein the actions include contacting a person or group via telephone or video conferencing.

9. The method according to claim 1, wherein the information flow includes information being transferred in real-time or pseudo real-time.

10. The method according to claim 1, further comprising the steps of:
determining information of relevance in the information flow; and
filtering the information flow such that only information of relevance is displayed in the user interface.

11. An apparatus for displaying a user interface, the apparatus comprising at least one processor, wherein the processor is configured to:
set a trigger event based on information in an information flow, the trigger event being associated with a financial instrument;
set one or more actions to occur based on occurrence of the trigger event;
receive the information flow;
display the user interface based on the information flow, the user interface being segmented into a plurality of sections including (1) a contact section in which contact information of a plurality of contacts is displayed and (2) a trigger notification section separate from the other ones of the plurality of sections, in which one or more trigger notification display icons respectively corresponding to each trigger event and indicating the respective trigger event that has occurred are displayed upon occurrence of the trigger event, wherein in a case that a trigger notification display icon of the one or more trigger notification display icons is selected, a second user interface drops down from the selected trigger notification display icon, including icons for modifying the trigger event for the corresponding trigger notification display icon or actions to be performed for the corresponding trigger event; and perform the set one or more actions upon selection of the trigger notification, wherein the performing the set one or more actions includes (1) filtering display of information from the information flow based on occurrence of the trigger event and (2) filtering display of the contact information so as to display contact information of ones of the plurality of contacts that are associated with the financial instrument.

12. The apparatus according to claim 11, wherein the trigger event is the financial instrument reaching a threshold value.

13. The apparatus according to claim 11, wherein the set actions include switching a part of the user interface to display a predetermined application in response to the trigger event.

14. The apparatus according to claim 11, wherein the information flow includes information of different multimedia types, and wherein the different multimedia types are displayed in different portions of the user interface.

15. The apparatus according to claim 11, wherein when multiple trigger events occur, the multiple trigger events are placed in a queue, and a plurality of trigger notifications are displayed within the trigger notification section, each of the trigger notifications being selectable to cause a corresponding action to be performed.

16. The apparatus according to claim 11, wherein the trigger notification is further selectable to cause display of a menu enabling modification of the one or more actions to occur based on occurrence of the trigger event.

17. The apparatus according to claim 11, wherein the plurality of sections further includes one or more of a video section, an information feed section, and an application workspace, and wherein the filtering includes reducing the information from the information feed displayed in one or more of the plurality of sections of the user interface so as to display only information associated with the trigger event.

18. The apparatus according to claim 11, wherein the actions include contacting a person or group via telephone or video conferencing.

19. The apparatus according to claim 11, wherein the information flow includes information being transferred in real-time or pseudo real-time.

20. The apparatus according to claim 11, wherein the processor is further configured to:

determine information of relevance in the information flow; and filter the information flow such that only information of relevance is displayed in the user interface.

21. A non-transitory computer-readable medium having stored thereon sequences of instructions, the sequences of instructions including instructions, which, when executed by a processor, cause the processor to perform:

setting a trigger event based on information in an information flow, the trigger event being associated with a financial instrument;

setting one or more actions to occur based on occurrence of the trigger event;

receiving the information flow;

displaying the user interface based on the information flow, the user interface being segmented into a plurality of sections including (1) a contact section in which contact information of a plurality of contacts is displayed and (2) a trigger notification section separate from the other ones of the plurality of sections, in which one or more trigger notification display icons respectively corresponding to each trigger event and indicating the respective trigger event that has occurred are displayed upon occurrence of the trigger event, wherein in a case that a trigger notification display icon of the one or more trigger notification display icons is selected, a second user interface drops down from the selected trigger notification display icon, including icons for modifying the trigger event for the corresponding trigger notification display icon or actions to be performed for the corresponding trigger event; and performing the set one or more actions upon selection of the trigger notification, wherein the performing the set one or more actions includes (1) filtering display of information from the information flow based on occurrence of the trigger event and (2) filtering display of the contact information so as to display contact information of ones of the plurality of contacts that are associated with the financial instrument.

* * * * *